(12) United States Patent
Ricketts

(10) Patent No.: US 6,795,828 B2
(45) Date of Patent: Sep. 21, 2004

(54) NAVIGATION AMONG CONDITIONAL QUESTIONS AND ANSWERS IN COMPUTER AND NETWORK BASED QUESTIONNAIRES

(75) Inventor: John Arthur Ricketts, Willowbrook, IL (US)

(73) Assignee: International Business Machines Corporation, Armonk, NY (US)

(*) Notice: Subject to any disclaimer, the term of this patent is extended or adjusted under 35 U.S.C. 154(b) by 589 days.

(21) Appl. No.: 09/813,700

(22) Filed: Mar. 21, 2001

(65) Prior Publication Data

US 2002/0138462 A1 Sep. 26, 2002

(51) Int. Cl.[7] .............................................. G06F 17/30
(52) U.S. Cl. ...................................................... 707/102
(58) Field of Search ........................................ 707/102

(56) References Cited

U.S. PATENT DOCUMENTS

| | | | |
|---|---|---|---|
| 5,471,560 A | 11/1995 | Allard et al. | |
| 5,517,405 A | 5/1996 | McAndrew et al. | |
| 5,784,562 A | 7/1998 | Diener | |
| 5,842,195 A | * 11/1998 | Peters et al. | 707/1 |
| 5,842,221 A | 11/1998 | Schmonsees | |
| 5,935,060 A | 8/1999 | Iliff | |
| 6,009,420 A | 12/1999 | Fagg, III et al. | |
| 6,022,315 A | * 2/2000 | Iliff | 600/300 |
| 6,032,177 A | 2/2000 | O'Donnell | |
| 6,092,197 A | * 7/2000 | Coueignoux | 713/200 |
| 6,171,112 B1 | * 1/2001 | Clark et al. | 434/322 |

FOREIGN PATENT DOCUMENTS

JP    1-147627    6/1989

OTHER PUBLICATIONS

"General Method for Defining Computer/User Dialogs without Code", IBM Technical Disclosure Bulletin, vol. 37, No. 08, pp. 227–229, Aug. 1994.

* cited by examiner

Primary Examiner—Wayne Amsbury
(74) Attorney, Agent, or Firm—Scully, Scott, Murphy & Presser; John B. Pivnichny

(57) ABSTRACT

A method and system for operating a questionnaire. One embodiment of the method comprises the steps of providing a plurality of questions, associating at least one condition with each of at least some of the questions, and storing each of the questions in an associated computer file. For each of said some of the questions, the at least one condition associated with the question is stored in the same computer file in which the question is stored. In accordance with this method, satisfied conditions are identified, the stored conditions are parsed and questions whose associated conditions are all satisfied, are identified, and the identified questions are presented to a respondent.

17 Claims, 4 Drawing Sheets

Conditional Questions.

| Questionnaire | Nesting Level | Stored Conditions |
|---|---|---|
| question #1 | 0 | (none) |
| IF A THEN | | |
|     question #2 | 1 | A |
|     IF B THEN | | |
|         question #3 | 2 | A and B |
|     ELSE IF C THEN | | |
|         question #4 | 2 | A and not B and C |
|     ELSE question #5 | 2 | A and not B and not C |
|     END IF | | |
|     question #6 | 1 | A |
| ELSE IF D THEN | | |
|     question #7 | 1 | not A and D |
| ELSE | | |
|     question #8 | 1 | not A and not D |
| END IF | | |
| question #9 | 0 | (none) |

Figure 2

Conditional Answers.

```
BEGIN QUESTION
    #1 "What country do you live in?"
    Country = CHOICE(US, Canada, other)
END QUESTION
BEGIN QUESTION
    #2 "What state or province do you live in?"
    IF Country = US THEN
        State = CHOICE( Alabama, Alaska, Arkansas, ...)
    ELSE IF Country = Canada THEN
        Province = CHOICE( Alberta, British Columbia, ...)
    END IF
END QUESTION
```

Figure 3

XML example.

```
<questionnaire>
<question number="1" text="What country do you live in?">
    <answers> <?appID "Country = CHOICE( US, Canada, other )" ?> </answers>
</question>
<question number="2" text="What state or province do you live in?">
<condition> <?appID "Country = US or Country = Canada" ?> </condition>
<answers> <?appID
    IF Country = US THEN
        State = CHOICE( Alabama, Alaska, Arkansas, …. )
    ELSE
        Province = CHOICE( Alberta, British Columbia, …. )
    END IF?> </answers>
</question>
</questionnaire>
```

Figure 4

NAVIGATION AMONG CONDITIONAL QUESTIONS AND ANSWERS IN COMPUTER AND NETWORK BASED QUESTIONNAIRES

BACKGROUND OF THE INVENTION

1. Field of the Invention

This invention generally relates to questionnaires, and more specifically, the invention relates to computer and network based questionnaires.

2. Prior Art

The problem of conditional questions and answers is often handled on paper questionnaires with embedded instructions to the respondent that say "if X is true, skip to question 14" or "if Y is true, select your answers from list B." But implementing such logic in computer- or network-based questionnaires is limiting because (a) it binds the software or web page tightly to the questionnaire, so a change in one often requires a change in the other, and (b) there is no way to navigate among conditional questions and answers except by accessing the questions in order until the conditions and corresponding instruction are located.

Because of these limitations, commonly, computer and network-based questionnaires do not have conditional questions or answers. Even when such questions and answers are provided, computer and network-based questionnaires may provide only sequential access to the questions.

SUMMARY OF THE INVENTION

An object of this invention is to improve computer and network based questionnaires.

Another object of the present invention is to provide an improved method and system for navigating among conditional questions and answers in computer- and network-based questionnaires.

A further object of this invention is to allow logic governing questions and answers to be specified in the computer file containing the questionnaire rather than implemented in software or a web page that display the questions and receive the answers.

These and other objects are attained with a method and system for operating a questionnaire. One embodiment of the method comprises the steps of providing a plurality of questions, associating at least one condition with each of at least some of the questions, and storing each of the questions in an associated computer file. For each of said at least some of the questions, the at least one condition associated with the question is stored in the same computer file in which the question is stored. In accordance with this method, satisfied conditions are identified, the stored conditions are parsed and questions whose associated conditions are all satisfied, are identified, and the identified questions are presented to a respondent.

The syntax and algorithm of this invention allow questionnaires implemented via a computer or network (such as the Internet) to contain conditional questions and answers. A respondent is asked a conditional question only if the governing conditions are true. A respondent is provided a specific set of answers to choose from depending on a separate set of conditions governing the answers.

More specifically, this invention solves the problem by parsing the conditions governing questions and answers and storing all the pertinent conditions where they can be retrieved when each question is accessed. It uses a parser and expression evaluator to determine the value of the conditions at run time. This allows navigation among questions and answers in any order even though some questions or answers may be conditional. In addition to moving to the previous or next questions, it's then possible for the respondent to navigate directly to the previous unanswered or next unanswered question, the first or last question within a questionnaire, or even navigate to a question in another questionnaire. If the stored conditions indicate that a specific question should not be asked, navigation proceeds in the current direction (toward the first or the last question) until an active question is found or the first or last question are reached.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 illustrates a questionnaire containing questions that depend on zero to many conditions.

FIG. 3 shows how questions can contain unconditional or conditional answers.

FIG. 4 shows conditional questions and answers in an XML excerpt.

DETAILED DESCRIPTION OF THE PREFERRED EMBODIMENTS

Figure 1:
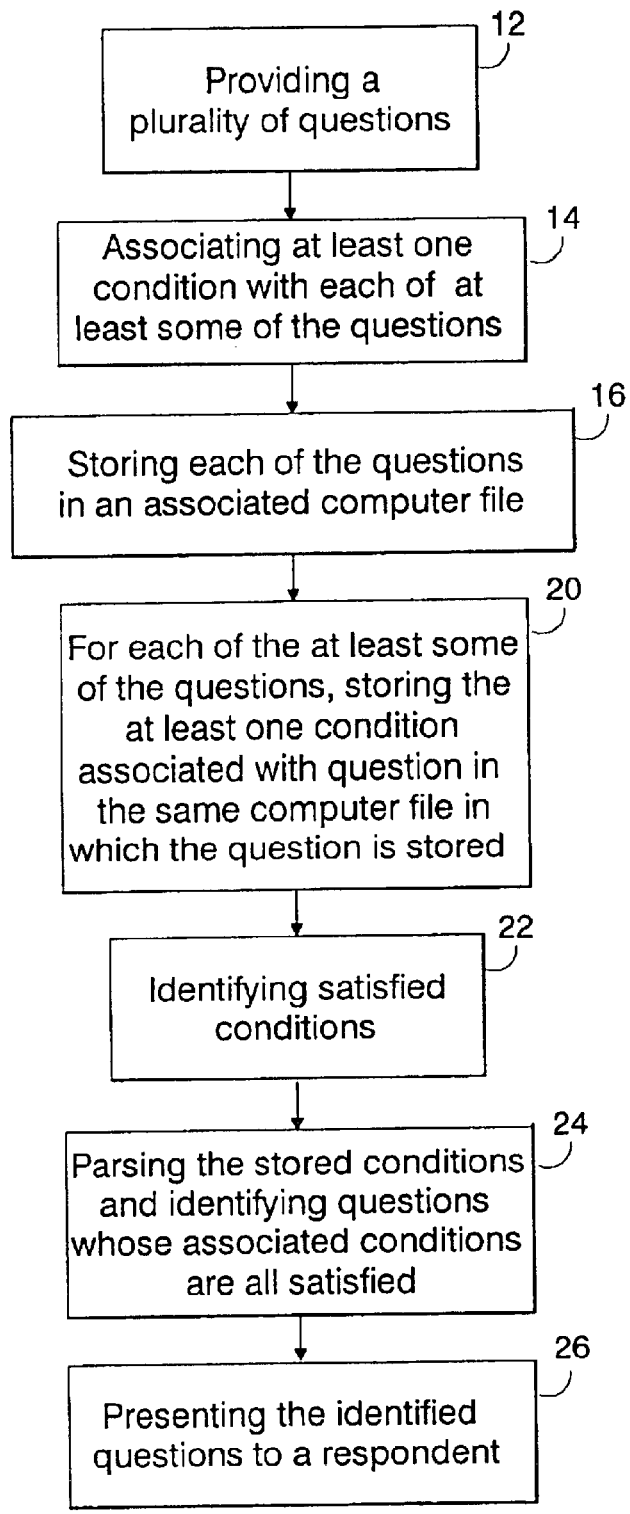
FIG. 1 outlines one method of implementing this invention.

FIG. 1 outlines one method embodying this invention. This method comprises the steps, represented at 12, 14 and 16, of providing a plurality of questions, associating at least one condition with each of at least some of the questions, and storing each of the questions in an associated computer file. As represented at step 20, the method comprises the further step of, for each of the at least some of the questions, storing the at least one condition associated with the question in the same computer file in which the question is stored. In accordance with this method, at step 22, satisfied conditions are identified; at step 24, the stored conditions are parsed and questions whose associated conditions are all satisfied, are identified; and at step 26, the identified questions are presented to a respondent.

FIG. 2 shows a questionnaire that contains questions that depend on zero to many conditions. Letters A through D stand for any valid mathematical or logical expression, such as "AGE>40 AND LOCATION=USA". This logic is parsed and all the relevant conditions are stored where they can be retrieved regardless of the order the respondent tries to answer the questions. For instance, question #4 is asked only if conditions A and C are true and B is false, regardless of which other questions have been answered. Suppose, however, only condition D were true. Only question #7 would be asked. No others would be asked, even if the respondent navigates from the last question toward the first question or tries to go directly to question #4.

Parsing is driven by keywords. "IF" adds one to the nesting level and pushes the next condition onto a stack. "ELSE" negates the previous condition (that is, "A" becomes "not A"). "ELSE IF" negates the previous condition and pushes the next condition onto the stack. "END IF" pops all the conditions at the current nesting level off the stack. As parsing proceeds, all active conditions—or a pointer to them when multiple questions share the same set of active conditions—are stored with each question. When parsing is complete, the original logic and stack are no longer needed and can be discarded.

Whether a given question is asked depends entirely on the result obtained by evaluating its stored conditions. The routine that evaluates the stored conditions looks up the current value of all referenced variables, including answers to other questions. When conditions contain references to answers to other questions, rather than system-provided data, such as the current date, questions become activated or deactivated as the respondent works through the questionnaire. For example, if the respondent answers "yes" to the question, "Do you have a computer at home?", questions pertaining to home computers become active.

FIG. 3 shows how questions can contain unconditional or conditional answers. The latter are parsed like conditional questions, but these conditions govern which set of valid answers the respondent must choose from. Presenting the respondent with a precise, short list can make questionnaires quicker and easier to complete. In this example, Country, State, and Province are variables. CHOICE is a function that displays the appropriate alternatives and returns the respondent's answer. Many other question types are possible, and would typically include multiple choice, fill-in-the-blank, and ranking questions, among others.

Conditional questions and answers can be implemented in files processed by computer software, as illustrated in FIGS. 2 and 3, but they also can be implemented in Extensible Markup Language (XML) for questionnaires conducted over the Internet. Upon receiving the questionnaire, XML processors pass processing instructions to an application that does additional parsing and evaluation as described above, and then displays active questions, accepts the respondent's answers, and returns them to the server as an XML answers document.

FIG. 4 shows conditional questions and answers in an XML excerpt. Question 2 is conditional, as are its answers. Processing instructions passed to the application are enclosed by <?appID . . . ?>

The preferred embodiment of this invention, as described above in detail, provides a number of important advantages. For instance, only questions targeted to a given respondent are shown, thereby saving time, and only answers targeted to a given respondent are allowed, thereby enhancing data integrity. Also, navigation among questions and answers can proceed in any order, within or between questionnaires, and is not limited to sequential access. Another significant advantage is that updates to conditional logic in the questionnaire do not require changes to software or web pages, thereby making updates faster and easier.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of operating a questionnaire, comprising the steps of:

providing a plurality of questions in one or more questionnaires;

parsing statements including conditions governing said questions to translate language containing conditions into stored conditions, said stored conditions being stored in an associated computer file;

accessing a question in a questionnaire;

retrieving said stored conditions when said question is accessed;

providing an answer to said question;

determining the value of said conditions in response to said answer to said question; and navigating to a second question from said plurality of questions in response to said value of said conditions.

2. A method according to claim 1, wherein:

each question is stored on an associated computer file; and all of the conditions governing each question are stored in the same computer file in which the question is stored.

3. A method according to claim 1, wherein:

each question is stored in an associated computer file; and the computer file in which each question is stared also stores either (i) all of the conditions governing the question, or (ii) a pointer to where all of the conditions governing the question are stored.

4. A method of operating a questionnaire, comprising the steps of:

providing a plurality of questions;

parsing statements including conditions governing at least some of the questions to translate language containing conditions into stored conditions associated with said at least some of the questions, said stored conditions being stored in an associated computer file;

storing each of the questions in an associated computer file;

identifying satisfied conditions;

parsing the stored conditions to identify questions whose governing conditions are all satisfied; and presenting the identified questions to a respondent.

5. A method according to claim 4, wherein the step of storing the questions includes the step of storing the questions in a series of nested levels.

6. A method according to claim 4, wherein the conditions include answers to questions.

7. A method according to claim 4, further including the step of selectively activating some of the questions, and wherein the step of identifying questions includes the step of identifying only activated questions whose associated conditions are all satisfied.

8. A method according to claim 4, wherein the step of parsing statements includes the steps of:

keeping track of nesting levels for each questions; and concatenating conditions each time another nesting level is encountered.

9. A method according to claim 8, wherein the step of parsing statements includes the further step of:

negating conditions each time an else leg of a conditions is encountered.

10. A system for operating a questionnaire, comprising:

means for providing a plurality of questions;

means for parsing statements including conditions governing each of at least some of the questions to translate language containing conditions into stored conditions associated with said each of at least some of the questions, said stored conditions being stored in an associated computer file;

at least one computer file, and wherein each of the questions is stored in an associated computer file;

means for identifying satisfied conditions;

means for parsing the stored conditions to identify questions whose governing conditions are all satisfied; and means for presenting the identified questions to a respondent.

11. A system according to claim 10, wherein the questions are stored in a series of nested levels.

12. A system according to claim 10, wherein the conditions include answers to questions.

13. A system according to claim 10, further including means for selectively activating some of the questions, and wherein the means for identifying questions includes means for identifying only activated questions whose associated conditions are all satisfied.

14. A program storage device readable by machine, tangibly embodying a program of instructions executable by the machine to perform method steps for operating a questionnaire, said method steps comprising:

providing a plurality of questions;

parsing statements including conditions governing each of at least some of the questions to translate language containing conditions into stored conditions associated with said each of at least some of the questions, said stored conditions being stored in an associated computer file;

storing each of the questions in an associated computer file;

for each of at least some of the questions, storing the at least one condition associated with the question in the same computer file in which the question is stored;

identifying satisfied conditions;

parsing the stored conditions and identifying questions whose associated conditions are all satisfied; and presenting the identified questions to a respondent.

15. A program storage device according to claim 14, wherein the step of storing the questions includes the step of storing the questions in a series of nested levels.

16. A program storage device according to claim 14, wherein the conditions include answers to questions.

17. A program storage device according to claim 14, wherein said method steps further include the step of selectively activating some of the questions, and wherein the step of identifying questions includes the step of identifying only activated questions whose associated conditions are all satisfied.

\* \* \* \* \*